United States Patent
Jacobson et al.

(10) Patent No.: US 10,631,005 B2
(45) Date of Patent: Apr. 21, 2020

(54) SYSTEM AND METHOD FOR CODING IN BLOCK PREDICTION MODE FOR DISPLAY STREAM COMPRESSION (DSC)

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US); Min Dai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 242 days.

(21) Appl. No.: 14/691,378

(22) Filed: Apr. 20, 2015

(65) Prior Publication Data

US 2015/0304675 A1    Oct. 22, 2015

Related U.S. Application Data

(60) Provisional application No. 61/982,216, filed on Apr. 21, 2014, provisional application No. 62/034,730,
(Continued)

(51) Int. Cl.
*H04N 19/55* (2014.01)
*H04N 19/57* (2014.01)
*H04N 19/593* (2014.01)

(52) U.S. Cl.
CPC ............. *H04N 19/55* (2014.11); *H04N 19/57* (2014.11); *H04N 19/593* (2014.11)

(58) Field of Classification Search
CPC ........ H04N 19/55; H04N 19/57; H04N 19/593
See application file for complete search history.

(56) References Cited

U.S. PATENT DOCUMENTS 9,282,338 B2    3/2016   Zheng et al.
2004/0028282 A1*  2/2004   Kato ................... H04N 19/176
                                            382/236
(Continued)

FOREIGN PATENT DOCUMENTS

JP    2006014343 A    1/2006
JP    2011254536 A    12/2011
(Continued)

OTHER PUBLICATIONS

Walls F., et al., "BDC-1: A robust algorithm for display stream compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].
(Continued)

*Primary Examiner* — Mohammed S Rahaman
(74) *Attorney, Agent, or Firm* — Shumaker & Sieffert, P.A.

(57) ABSTRACT

A system and method for coding a block of video data in block prediction mode for display stream compression (DSC) is disclosed. In one aspect, the method includes determining a candidate block to be used for predicting a current block in a current slice. The candidate block may be within a range of locations defined by one or more block prediction parameters. The method further includes determining, based on the candidate block and the current block, a prediction vector identifying a location of the candidate block with respect to the current block, and coding the current block in block prediction mode at least in part via signaling the prediction vector identifying the location of the candidate block with respect to the current block.

28 Claims, 11 Drawing Sheets

Related U.S. Application Data filed on Aug. 7, 2014, provisional application No. 62/093,390, filed on Dec. 17, 2014.

(56) References Cited

U.S. PATENT DOCUMENTS

| | | | | |
|---|---|---|---|---|
| 2005/0286777 | A1* | 12/2005 | Kumar | H04N 19/00 382/232 |
| 2008/0062327 | A1* | 3/2008 | MacInnis | G06T 5/50 348/701 |
| 2009/0115909 | A1* | 5/2009 | Walls | H04N 5/145 348/699 |
| 2009/0274215 | A1* | 11/2009 | Metsugi | H04N 19/52 375/240.16 |
| 2011/0103485 | A1 | 5/2011 | Sato et al. | |
| 2014/0092957 | A1* | 4/2014 | MacInnis | H04N 19/61 375/240.02 |

FOREIGN PATENT DOCUMENTS

| | | |
|---|---|---|
| WO | 03026315 A1 | 3/2003 |
| WO | 2012177388 A1 | 12/2012 |

OTHER PUBLICATIONS

International Search Report and Written Opinion—PCT/US2015/026870—ISA/EPO—dated Jul. 2, 2015.
Response to Written Opinion dated Jul. 2, 2015, in International Application No. PCT/US2015/026870, filed Feb. 17, 2016, 13 pp.
Second Written Opinion dated Apr. 15, 2016, in International Application No. PCT/US2015/026870, 6 pp.
Response to Second Written Opinion dated Apr. 15, 2016, in International Application No. PCT/US2015/026870, filed Jun. 13, 2016, 14 pp.
International Preliminary Report on Patentability—PCT/US2015/026870, The International Bureau of WIPO—Geneva, Switzerland, Jun. 29, 2016, 16 pp.
ITU-T: "H. 265 High Efficiency Video Coding", SERIES H: Audiovisual and Multimedia Systems, Apr. 30, 2013, 7.3.8.11, 7.4.9.11, 317 Pages, Retrieved from Internet URL: https://www.itu.int/rec/dologin_pub.asp?lang=e&id=T-REC-H.265-201304-S!!PDF-E&type=items.

* cited by examiner

SYSTEM AND METHOD FOR CODING IN BLOCK PREDICTION MODE FOR DISPLAY STREAM COMPRESSION (DSC)

INCORPORATION BY REFERENCE TO PRIORITY APPLICATIONS

This application claims the benefit of U.S. Provisional Application No. 61/982,216, filed Apr. 21, 2014, U.S. Provisional Application No. 62/034,730, filed Aug. 7, 2014, and U.S. Provisional Application No. 62/093,390, filed Dec. 17, 2014.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method for coding video data in block prediction mode includes: determining a candidate block to be used for predicting a current block in a current slice, the candidate block being within a range of locations defined by one or more block prediction parameters, wherein the candidate block is stored in a memory of a video encoding device; determining, based on the candidate block and the current block, a prediction vector identifying a location of the candidate block with respect to the current block; and coding the current block in block prediction mode at least in part via signaling the prediction vector identifying the location of the candidate block with respect to the current block.

In another aspect, an apparatus configured to code video data in a bitstream in block prediction mode includes a memory and a processor in communication with the memory. The memory is configured to store the video data. The processor is configured to: determine a candidate block to be used for predicting a current block in a current slice, the candidate block being stored in the memory and being within a range of locations defined by one or more block prediction parameters; determine, based on the candidate block and the current block, a prediction vector identifying a location of the candidate block with respect to the current block; and code the current block in block prediction mode at least in part via signaling the prediction vector identifying the location of the candidate block with respect to the current block.

In another aspect, a non-transitory computer readable medium contains code that, when executed, causes an apparatus to: determine a candidate block to be used for predicting a current block in a current slice, the candidate block being within a range of locations defined by one or more block prediction parameters; determine, based on the candidate block and the current block, a prediction vector identifying a location of the candidate block with respect to the current block; and code the current block in block prediction mode at least in part via signaling the prediction vector identifying the location of the candidate block with respect to the current block.

In another aspect, a video coding device configured to code video data in a bitstream in block prediction mode includes: means for determining a candidate block to be used for predicting a current block in a current slice, the candidate block being within a range of locations defined by one or more block prediction parameters; means for determining, based on the candidate block and the current block, a prediction vector identifying a location of the candidate block with respect to the current block; and means for coding the current block in block prediction mode at least in part via signaling the prediction vector identifying the location of the candidate block with respect to the current block.

DETAILED DESCRIPTION

Figure 1A:
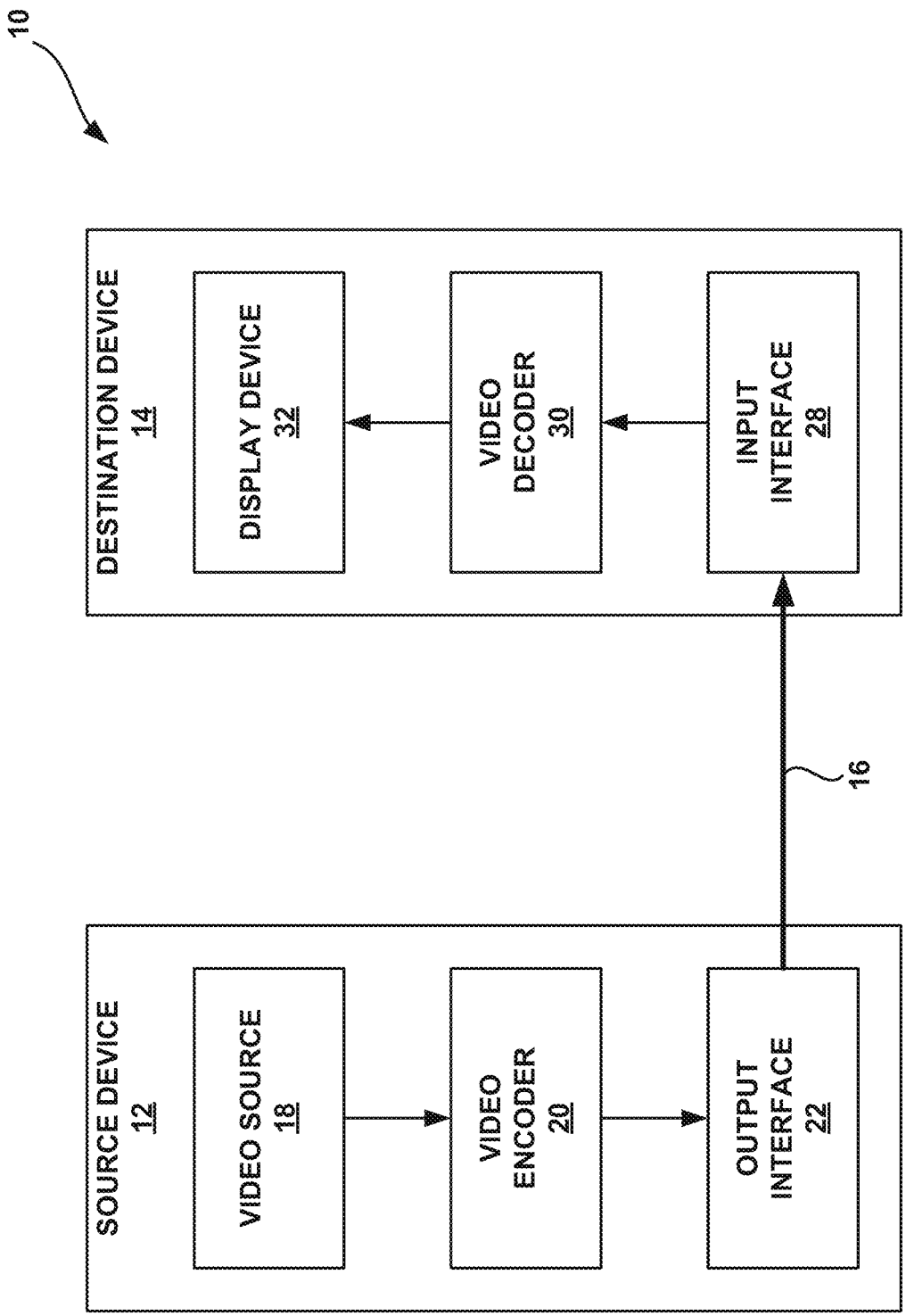
FIG. 1A is a block diagram illustrating an example video encoding and decoding system that may utilize techniques in accordance with aspects described in this disclosure.

In general, this disclosure relates to methods of improving video compression techniques such as DSC. More specifically, the present disclosure relates to systems and methods for coding a block of video data in block prediction mode.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

The DSC standard includes a number of coding modes in which each block of video data may be encoded by an encoder and, similarly, decoded by a decoder. In some implementations, the encoder and/or the decoder may predict the current block to be coded based on a previously coded block.

However, the existing coding modes (e.g., transform coding, differential pulse-code modulation, etc.) do not provide a satisfactory way of compressing highly complex regions in video data. Often, for this type of data (i.e., highly compressed video data), the current block to be coded (or the current block's constituent sub-blocks) is similar in content to previous blocks that have been encountered by the coder (e.g., encoder or decoder). However, the existing intra prediction may be too limited to provide a satisfactory prediction of such a current block (e.g., prediction that would yield a sufficiently small residual). Thus, an improved method of coding blocks of video data is desired.

In the present disclosure, an improved method of coding a block in block prediction mode is described. For example, when searching for a candidate block to be used to predict the current block, a search range may be defined such that the encoder has access to potential candidates that may be a good match while minimizing the search cost. In another example, the method may include explicitly signaling a prediction for each block (or each partition). By performing more operations (e.g., searching for a candidate block to be used for predicting the current block, calculating a vector identifying the location of the candidate block with respect to the current block, etc., which may consume computing resources and processing power) on the encoder side, the method may reduce decoder complexity.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
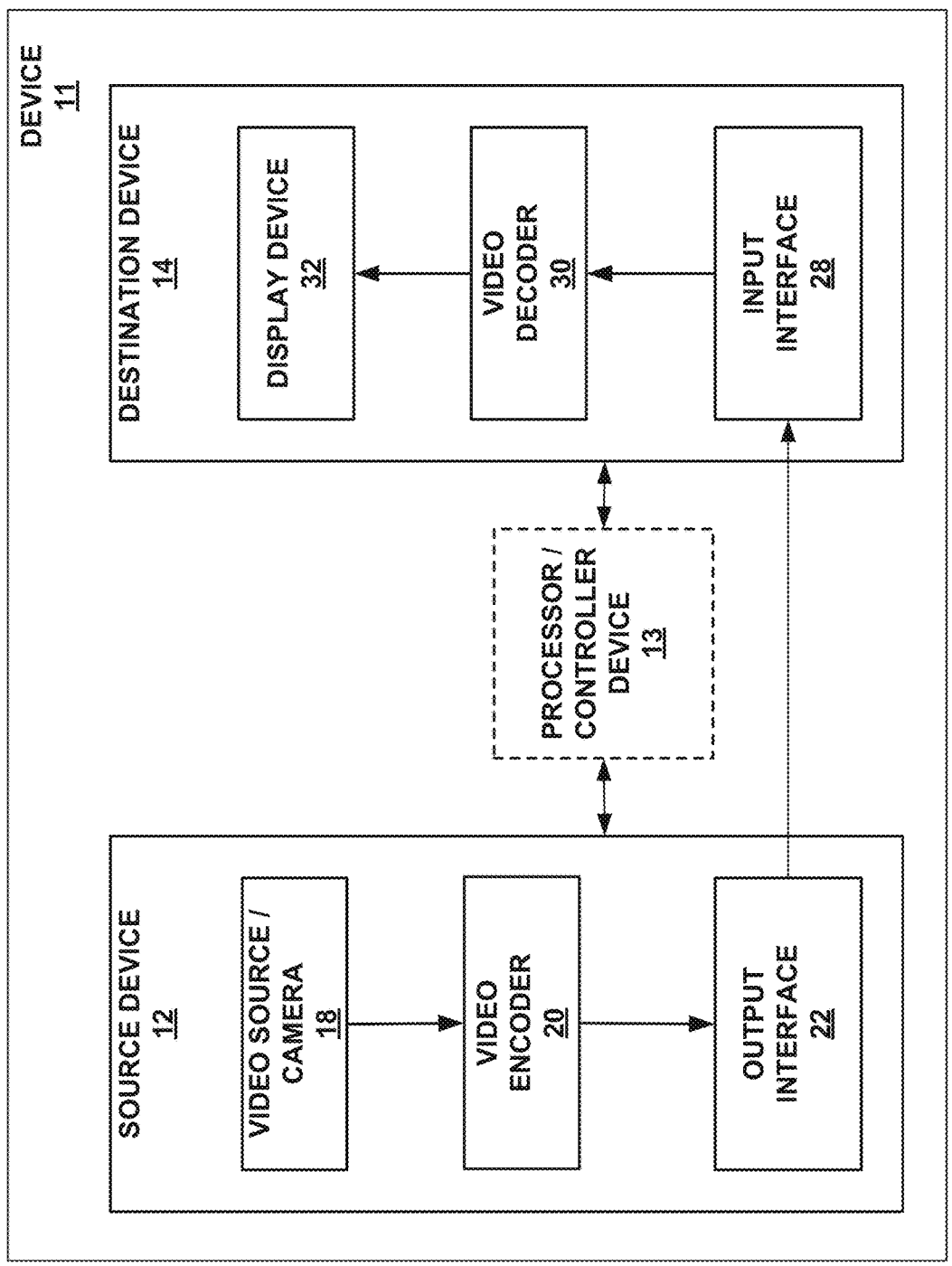
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart"

phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or it may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
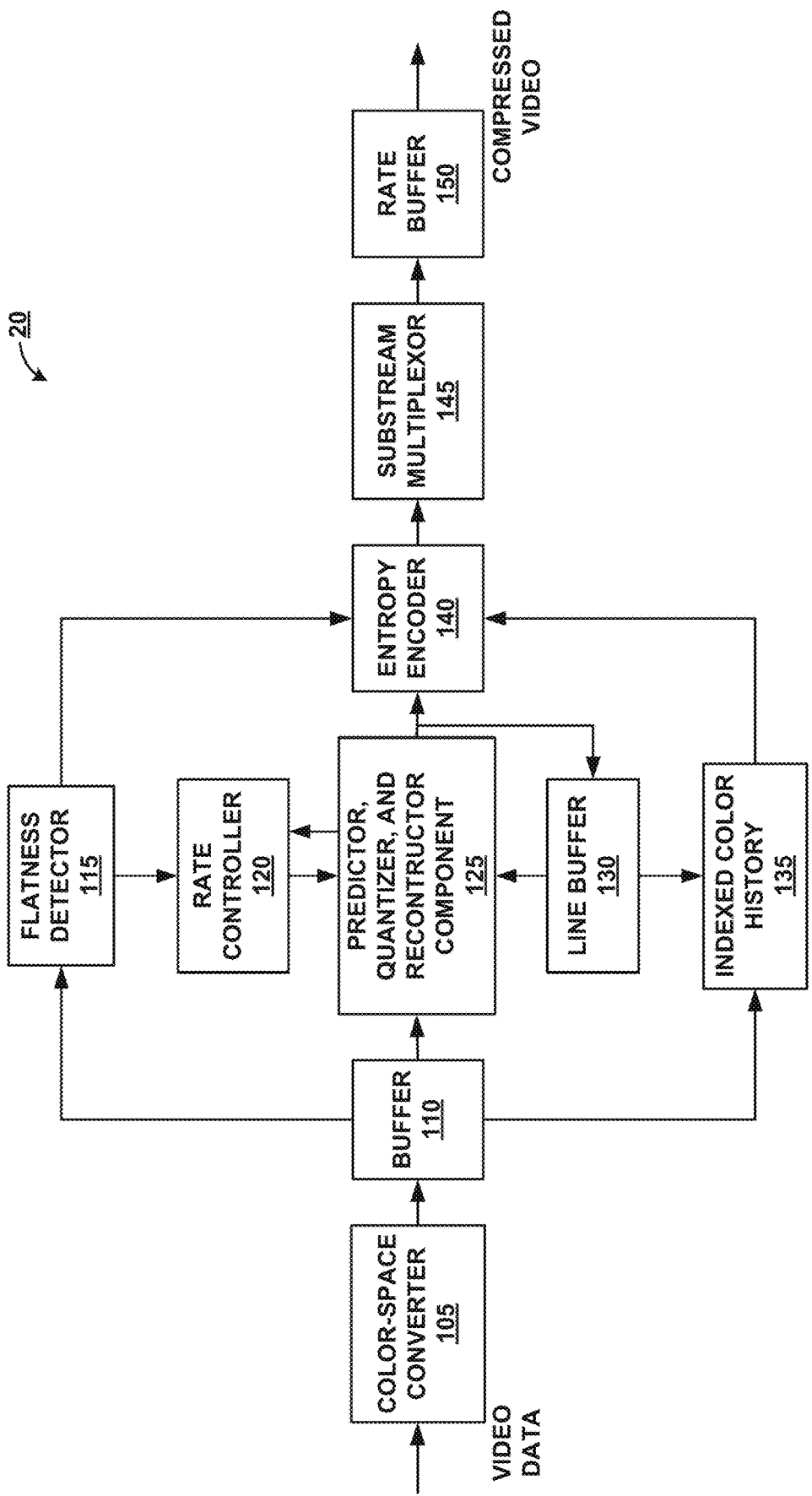
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels to the left. The video encoder 20 and the video decoder 30 can both perform an identical search on reconstructed pixels to determine the block prediction usages, and thus, no bits need to be sent in the block prediction mode. A midpoint prediction mode may also be implemented in which samples are predicted using the midpoint of the component range. The midpoint prediction mode may enable bounding of the number of bits required for the compressed video in even the worst-case sample. As further discussed below with reference to FIG. 7, the predictor, quantizer, and reconstructor component 125 may be configured to predict (e.g., encode or decode) the block of video data (or any other unit of prediction) by performing the methods illustrated in FIG. 7.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
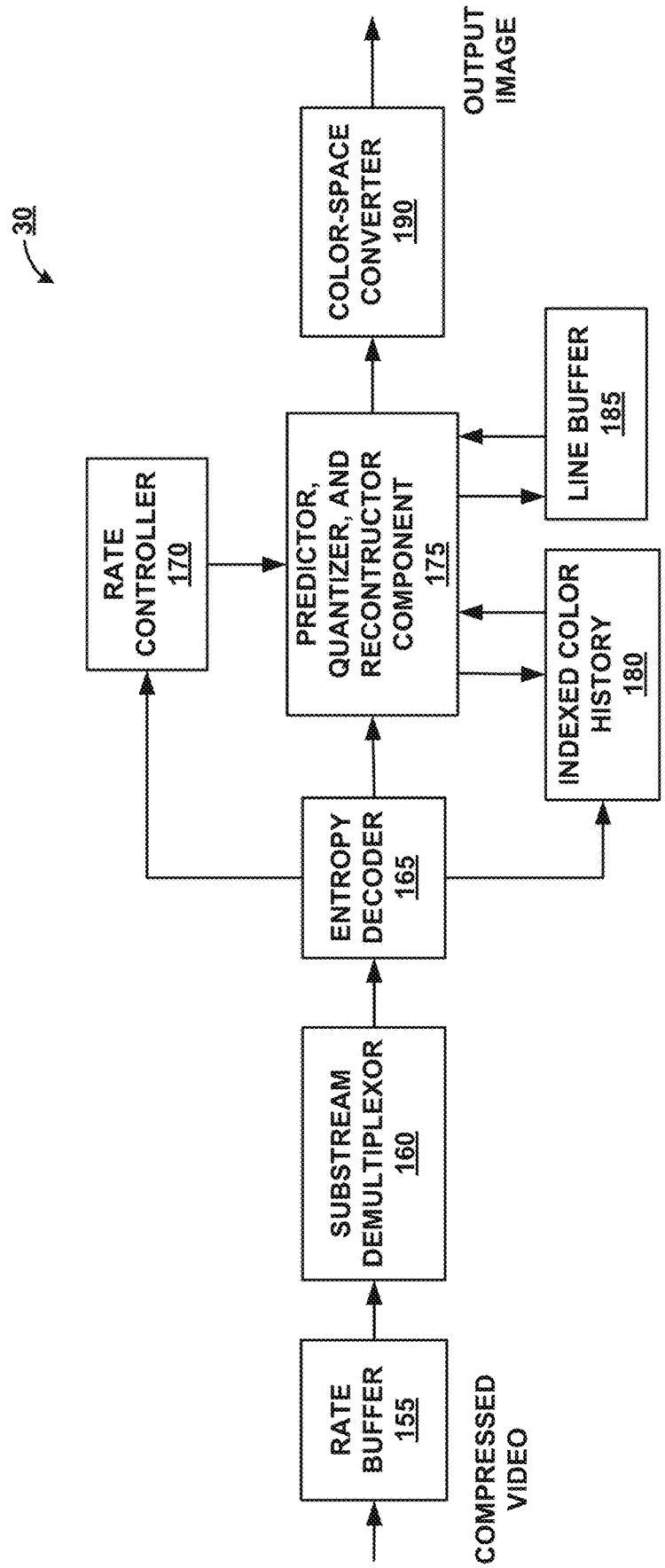
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video encoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or it may be encoded in several slices. In DSC, the target bits allocated to encode each slice may be substantially constant.

Block Prediction Mode

A single block of video data may contain a number of pixels, and each block of video data has a number of potential coding modes in which the block can be coded. One of such coding modes is block prediction mode. In block prediction mode, the coder attempts to find a candidate block in the previous reconstructed line (e.g., if the current block is not in the first line of the current slice) or previous reconstructed blocks in the same line (e.g., if the current block is in the first line of the current slice) that is close (e.g., in pixel values) to the current block to be coded. In some embodiments, closeness between pixel values is determined by the Sum of Absolute Differences (SAD) metric. The coder may attempt to find the candidate block in any portion of the previously reconstructed blocks defined by a search range (e.g., which may be a predetermined value known to both the encoder and the decoder). The search range is defined such that the encoder has potential candidates within the search range to find a good match while minimizing the search cost. The coding efficiency of block prediction mode comes from the fact that, if a good candidate (i.e., a candidate within the search range that is determined to be close in pixel values to the current block to be coded) is discovered, the difference (known as the residual) between the candidate block and the current block will be small. The small residual will take a fewer number of bits to signal compared to the number of bits needed to signal the actual pixel values of the current block, thereby resulting in a lower rate-distortion cost and increasing the likelihood of being selected by the rate-control mechanism. The performance boost from enabling block prediction mode is extremely significant for certain types of graphics content, as described below with reference to FIGS. 9 and 10.

Parameters in Block Prediction Mode

The block prediction mode is designed to produce a candidate block, given a specified search range, that provides the minimum distortion from the current block to be encoded. In some embodiments, minimum distortion is defined using SAD. In some implementations of the present disclosure, the block prediction method is defined by three parameters: search range (SR), skew ($\alpha$), and partition size ($\beta$). These three parameters affect the performance of the block prediction mode, and may be tuned (i.e., modified or reconfigured) during implementation. These parameters may be known to both the encoder and the decoder.

Search Space in Block Prediction Mode

Figure 3:
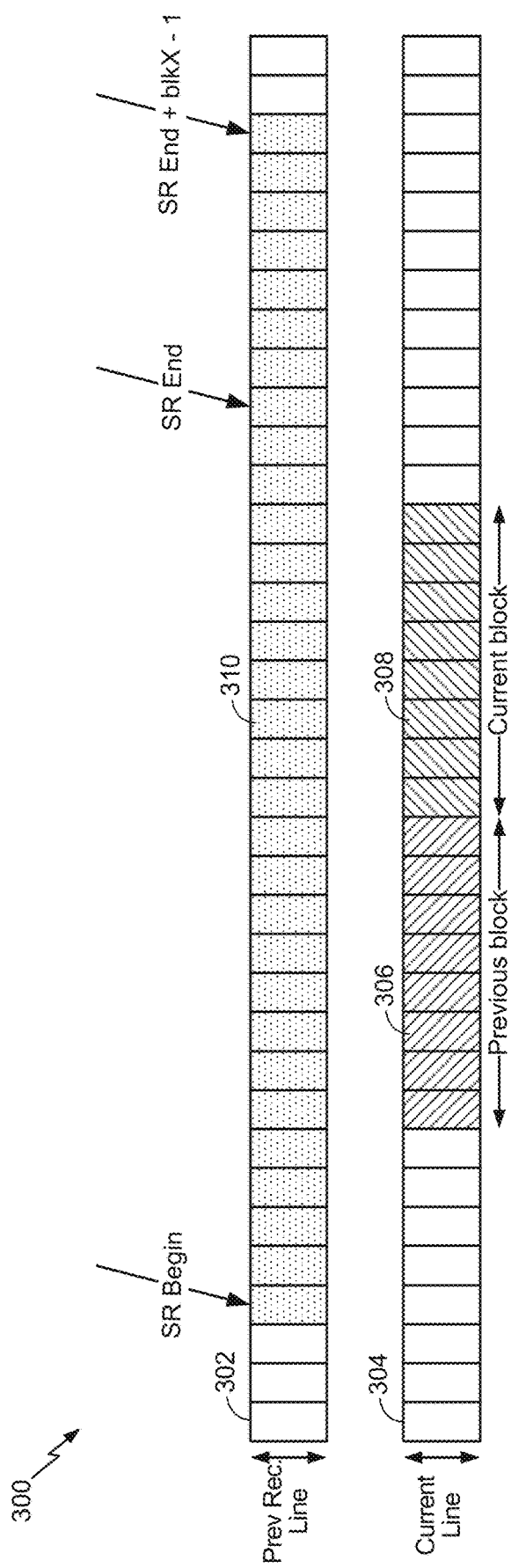
FIG. 3 is a block diagram illustrating the search space for a non-first line for a 1-D block in accordance with aspects described in this disclosure.
Figure 4:
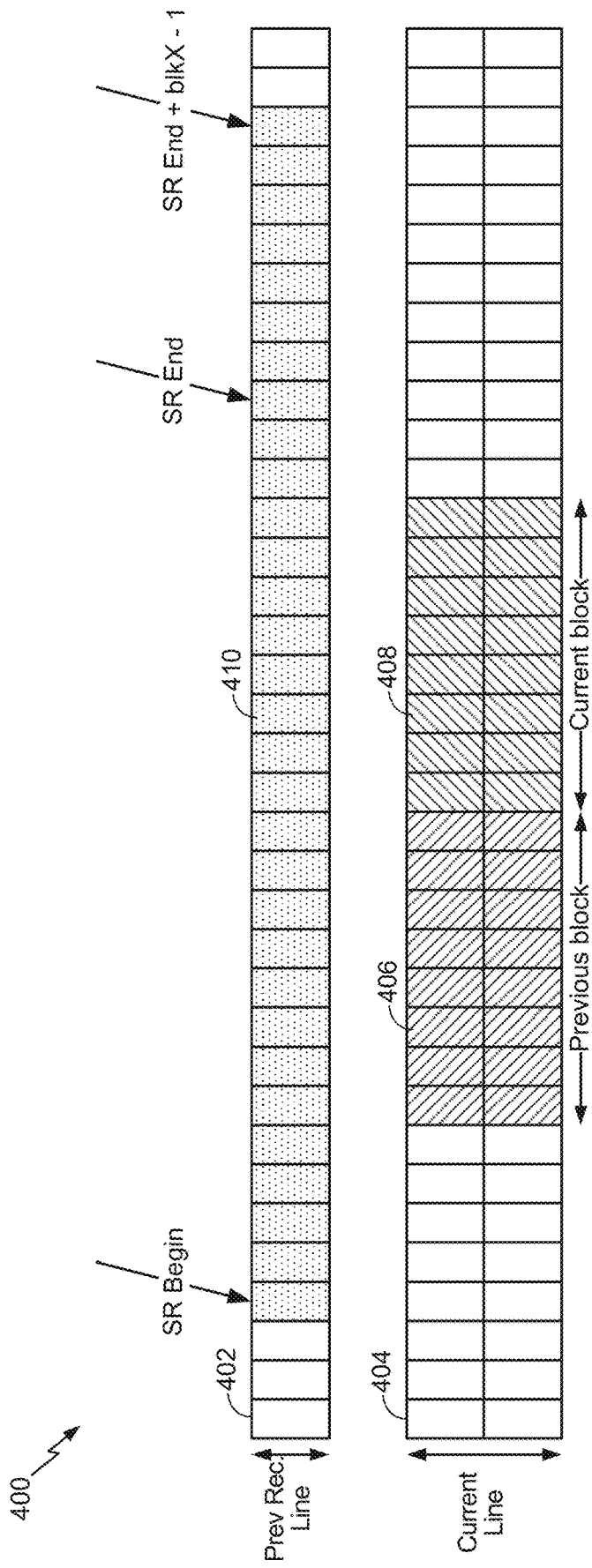
FIG. 4 is a block diagram illustrating the search space for a non-first line for a 2-D block in accordance with aspects described in this disclosure.
Figure 5:
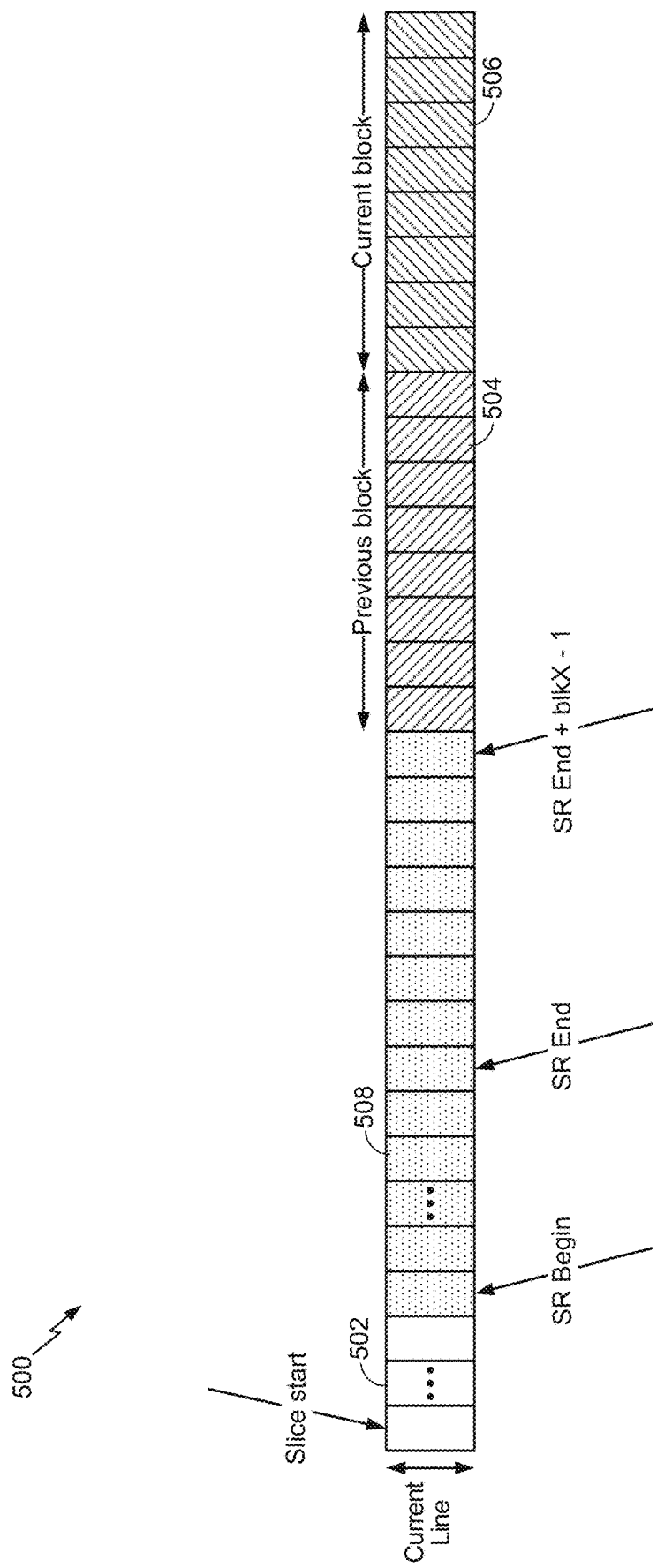
FIG. 5 is a block diagram illustrating the search space for a first line for a 1-D block in accordance with aspects described in this disclosure.
Figure 6:
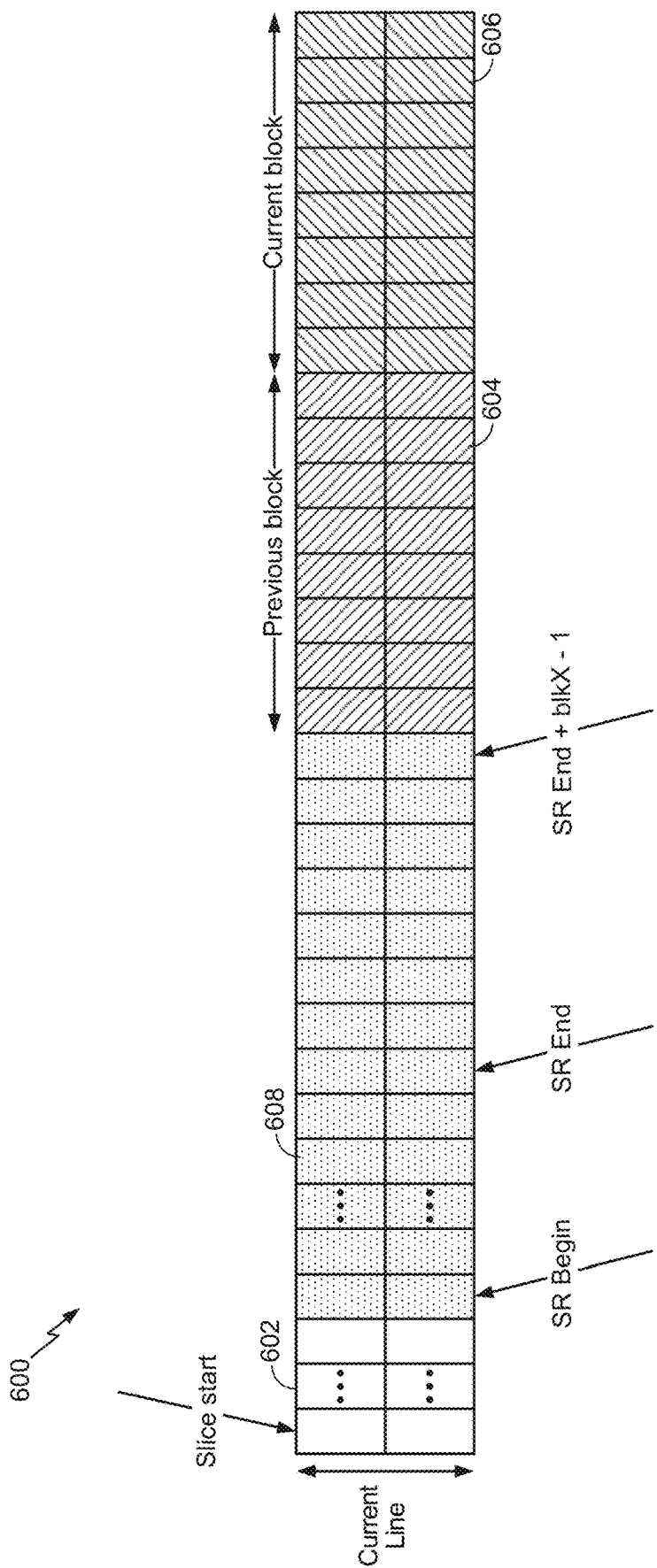
FIG. 6 is a block diagram illustrating the search space for a first line for a 2-D block in accordance with aspects described in this disclosure.

In some embodiments of the present disclosure, the search space (e.g., spatial locations of pixels that the encoder may search in order to find a candidate block) may differ based on the characteristics of the current block. The search space may encompass all previously reconstructed blocks/pixels, but the encoder and/or the decoder may limit the search for a candidate block to a specified portion (e.g., a "search range" defined by one or more parameters that are either predefined or signaled in the bitstream) within the search space, for example, to reduce computational complexity. Examples of the block prediction search space are illustrated in FIGS. 3-6. FIGS. 3 and 4 illustrate cases involving a current block (e.g., current blocks 308 and 408) that is not in the first line of the current slice. FIGS. 5 and 6 illustrate cases involving a current block (e.g., current blocks 506 and 606) that is in the first line of the current slice. These two cases are handled separately because the first line in a slice has no vertical neighbors. Therefore, the reconstructed pixels from the current line can be leveraged as a search range (e.g., search ranges 508 and 608). In the present disclosure, the first line in the current slice may be referred to as an FLS and any other line in the current slice may be referred to as an NFLS.

Further, the block prediction techniques described herein may be implemented in either a codec using a single line buffer (i.e., 1-D block size) or a codec using multiple line buffers (i.e., 2-D block size). Examples of the search space for the 1-D case are shown in FIGS. 3 and 5, and examples of the search space for the 2-D case are shown in FIGS. 4 and 6. In the 2-D case, the search range may include pixels from the previous reconstructed line (e.g., previous line 402) or reconstructed blocks from the same lines as those in the 2-D block (e.g., previous 604 in the current line 602, which is immediately to the left of the current block 606). The 2-D block may be partitioned either horizontally or vertically or both. In the case involving block partitions, a block prediction vector may be specified for each block partition.

Example Implementations of Block Prediction Mode

In some embodiments of the present disclosure, a distortion metric other than SAD may be used, e.g. sum of squared differences (SSD). Alternately or additionally, the distortion may be modified by weighting. For example, if the YCoCg color space is being used, then the cost may be calculated as:

$$SAD(Y) + \frac{SAD(Co) + SAD(Cg)}{2}$$

The block prediction techniques described herein may be performed either in the RGB or YCoCg color space. In addition, an alternative implementation may use both color spaces and signal a 1-bit flag to the decoder indicating which of the two color spaces is selected (e.g., whichever color space that has the lowest cost in terms of rate and distortion).

In some embodiments of the present disclosure concerning FLS, the direct previous reconstructed block or blocks may be excluded from the search range due to pipelining and timing constraints. For example, depending on the hardware implementation, the coder may not have completed the processing of the direct previous reconstructed block by the time the current block is processed by the coder (e.g., the reconstructed pixels for the previous block may not be known when the coder begins processing the current block), resulting in delays or failures. In such an implementation, by restricting the use of previous reconstructed blocks to those blocks for which reconstructed pixel values are known (e.g., by excluding the direct previous reconstructed block or blocks), the pipelining concerns illustrated above may be resolved. In some embodiments of the present disclosure concerning NFLS, the search range to the left of the current block may be from the same line rather than the previous reconstructed line. In some of such embodiments, one or more previous reconstructed blocks may be excluded from the search range due to pipelining and timing constraints.

Example Implementation of NFLS

As shown in FIG. 3, the block prediction method may search through the search range 310 (SR) in the search space to find a candidate for the current block 308 (and similarly in the search space 400 of FIG. 4). If the x-coordinate position of the first pixel of the current block 308 to be encoded is j, then the set of starting positions k of all candidate blocks within the search space may be given as:

$$k \in [j-SR+(\alpha+1), j+\alpha]$$

In this example, the parameter a skews the x-coordinate position of the search range 310 relative to the current block to be encoded. A higher value of a shifts the search range 310 to the right, while a lower value of a shifts the search range 310 to the left. For example, (i) SR of 32 and $\alpha$ of 15 may place the search range 310 in the center of the previous line 302, (ii) SR of 32 and $\alpha$ of 0 may place the search range 310 on the left side of the previous line 302, and (iii) SR of 32 and a of 31 may place the search range 310 on the right side of the previous line 302.

In some implementations of the present disclosure, a pixel that is within the search range but outside of the slice boundary may be set to half the dynamic range for that pixel. For example, if the content is RGB888, then the default value of 128 may be used for R, G, and B. If the content is in the YCoCg space, then a default value of 128 may be used for Y, and a default value of 0 may be used for Co and Cg (e.g., Co and Cg are 9-bit values that are centered around 0).

Example Implementation of FLS

As shown in FIG. 5, the search range may be different for the FLS case. This is because vertical neighbors are not available because such vertical neighbors are outside of the current frame, or because such vertical neighbors are contained within a different slice. In some embodiments of the present disclosure concerning the FLS case, pixels in the current line may be used for block prediction. In one embodiment, any pixel in the current line to the left of the current block may be considered as part of the search range. In another embodiment, one or more previously coded blocks (e.g., the previous block 504 that is immediately to the left of the current block) may be excluded from the search range due to pipelining and timing constraints.

In some implementations of FLS, the available range for the first few blocks in the first line of the slice may be less than the search range that is typically expected for other blocks. This is because the valid position for candidate blocks starts at the beginning of the line and ends before the current block. For the first few blocks in the FLS, this valid range may be smaller than the desired range (e.g., 32 or 64 positions). Thus, for these blocks, the search range may need to be adjusted such that each block partition of the candidate block is fully contained within the search range. For NFLS, the search range may be shifted left or right such that the total number of search positions is equal to the defined search range (e.g., 32 or 64 pixel positions). Since j is the first pixel in the current block, the last pixel in the current block will be j+blkWidth−1. For this reason, the search range may need to be shifted (blkWidth−1) pixels to the left.

In some implementations of FLS, if the x-coordinate location of the first pixel of the current block to be encoded is referred to as j, then the set of starting positions of all candidate blocks within the search range is given as:

(i) if most recent previous reconstructed block is part of the search range, e.g., $\alpha=-1$:

$$k \in [j-SR-(blkWidth-1), j-1-(blkWidth-1)]$$

(ii) if n most recent previous reconstructed blocks are to be excluded from the search range:

$$k \in [j-(n \cdot blk_x+SR)-(blkWidth-1), j-(n \cdot blk_N+1)-(blkWidth-1)]$$

where $blk_x$ is the block width. Any pixel outside of the slice boundary may be set to a default value as described above in connection with the NFLS case. It should also be noted that no skew parameter need be associated with the FLS case.

Example Flowchart for Coding in Block Prediction Mode

Figure 7:
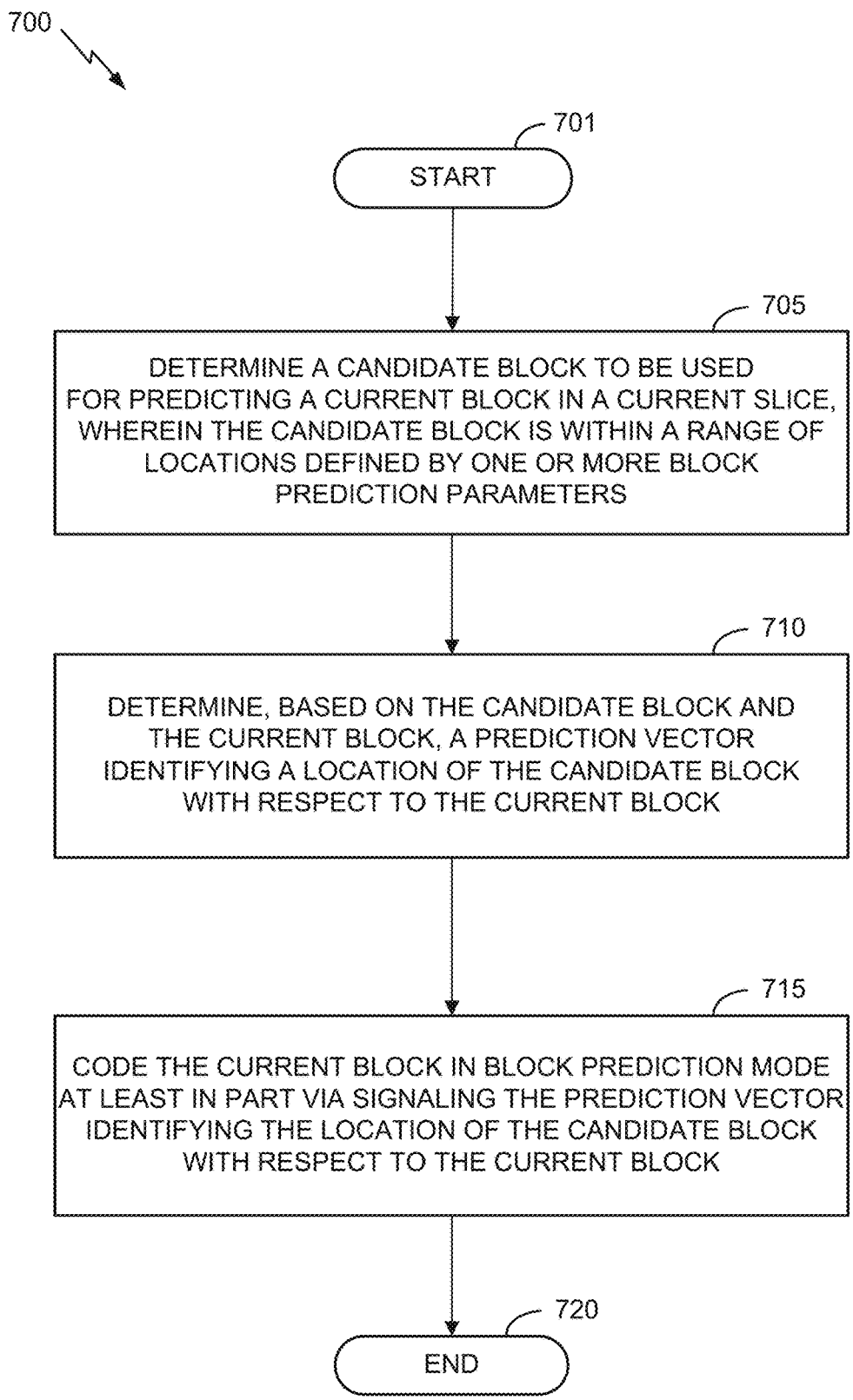
FIG. 7 is a flowchart illustrating a method for predicting a block of video data in block prediction mode in accordance with aspects described in this disclosure.

With reference to FIG. 7, an example procedure for coding a block of video data in block prediction mode will be described. The steps illustrated in FIG. 7 may be performed by a video encoder (e.g., the video encoder 20 in FIG. 2A), a video decoder (e.g., the video decoder 30 in FIG. 2B), or component(s) thereof. For convenience, method 700 is described as performed by a video coder (also simply referred to as coder), which may be the video encoder 20, the video decoder 30, or another component.

The method 700 begins at block 701. At block 705, the coder determines a candidate block to be used for predicting a current block in a current slice. The candidate block may be within a range of locations defined by one or more block prediction parameters. For example, the block prediction parameters may include (i) a search range parameter defining the size of the range of locations, (ii) a skew parameter defining the relative location of the range of locations with respect to the current block, and (iii) a partition size parameter defining the size of each partition in the current block. In some embodiments of the present disclosure, each of the search range parameter, the skew parameter, and the partition size parameter spatially, rather than temporally, define the locations of the candidate block.

At block 710, the coder determines a prediction vector based on the candidate block and the current block. The prediction vector may identify the location of the candidate block with respect to the current block. The prediction vector may include one or more coordinate values (e.g., a coordinate value indicating the offset in the 1-D space). At block 715, the coder codes the current block in block prediction mode at least in part via signaling the prediction vector. In some embodiments, the coder may also signal the residual between the candidate block and the current block. Bit savings may be achieved by signaling the prediction vector identifying the location of the candidate block and the residual representing the difference between the current block and the candidate block, instead of having to signal the actual pixel values of the current block. The method 700 ends at block 720.

In the method 700, one or more of the blocks shown in FIG. 7 may be removed (e.g., not performed) and/or the order in which the method is performed may be switched. In some embodiments, additional blocks may be added to the method 700. The embodiments of the present disclosure are not limited to or by the example shown in FIG. 7, and other variations may be implemented without departing from the spirit of this disclosure.

After Finding Candidate Block

After the best candidate block has been determined, the pixel values of the candidate block are subtracted from the pixel values of the current block, resulting in the residual. The residual may be quantized based on a pre-selected QP associated with the block prediction mode. The quantized residual may be encoded using a codebook (which can be either fixed-length or variable-length) and signaled using a fixed-length code or a variable-length code. The selected codebook may be based on the coding efficiency and hardware complexity requirements. For example, the selected codebook may be an Exp-Golomb codebook. In some embodiments of the present disclosure, an entropy coding scheme that is similar to the delta size unit variable length coding (DSU-VLC) of existing DSC implementations may be used. In some embodiments, the residual may be transformed (e.g., using a direct cosine transform, a Hadamard transform, or other known transforms) before the quantization described above.

In some embodiments of the present disclosure, the samples in the residual of the current block may be partitioned into multiple groups (e.g., 4 samples per group for a block that contains 16 samples). If all the coefficients in the block are zero, then the residual of the block is coded using skip mode, i.e., 1-bit flag per block (per component) is signaled to indicate if the current component in the block is coded using skip mode or not. If at least one non-zero value is contained within the block, each group may be coded using DSU-VLC only if the group has one non-zero value. If the group (e.g., 4 samples of the 16 samples in the residual) does not contain any non-zero values, the group is coded using skip mode, i.e., 1-bit flag per group is signaled to indicate if the group is coded using skip mode or not. More specifically, for each group, a search may be performed to determine whether all the values in the group are zero. If all the values in the group are zero, a value of '1' may be signaled to the decoder; otherwise (if at least one value is non-zero), a value of '0' may be signaled to the decoder, followed by the coding of the DSU-VLC coding. In an alternative example, a value of '0' may be signaled if all the values in the group are zero and a value of '1' may be signaled if the group contains at least one non-zero value.

In some embodiments of the present disclosure, the best candidate block is signaled explicitly to the decoder by transmitting a fixed-length code containing the best offset. The offset may be referred to as a "vector". The advantage of signaling the vector explicitly to the decoder is that the decoder will not have to perform the block search itself. Rather, the decoder will receive the vector explicitly and add the candidate block to the decoded, de-quantized residual values to determine the pixel values of the current block.

Block Partitioning

In some embodiments of the present disclosure, the current block to be coded may be partitioned, resulting in multiple candidate blocks and multiple vectors per block. In some of such embodiments, the vector(s) may be explicitly signaled using a fixed-length code. For example, the length of this fixed-length code may be $\log_2(SR)$. In another embodiment, the vector(s) may be explicitly signaled using a variable-length code, such as a code from the Exponential-Golomb or Golomb-Rice code families. This codebook could be selected based on the statistical distribution associated with vector(s). In yet another embodiment, the vector(s) may be predicted based on the previously-coded vector(s), and the residual of the vector(s) may be coded using some fixed-length or variable-length code. In yet another embodiment, the vector(s) may be predicted based on the previously-coded vector(s), and a 1-bit flag may be used to signal whether the two vectors are identical. This flag may be referred to as SameFlag. If SameFlag=1, then the vector value itself need not be signaled to the decoder. If SameFlag=0, then the vector will be signaled explicitly (e.g., using either a fixed-length or variable-length code). An example block partitioning scheme is illustrated in FIG. 8.

Figure 8:
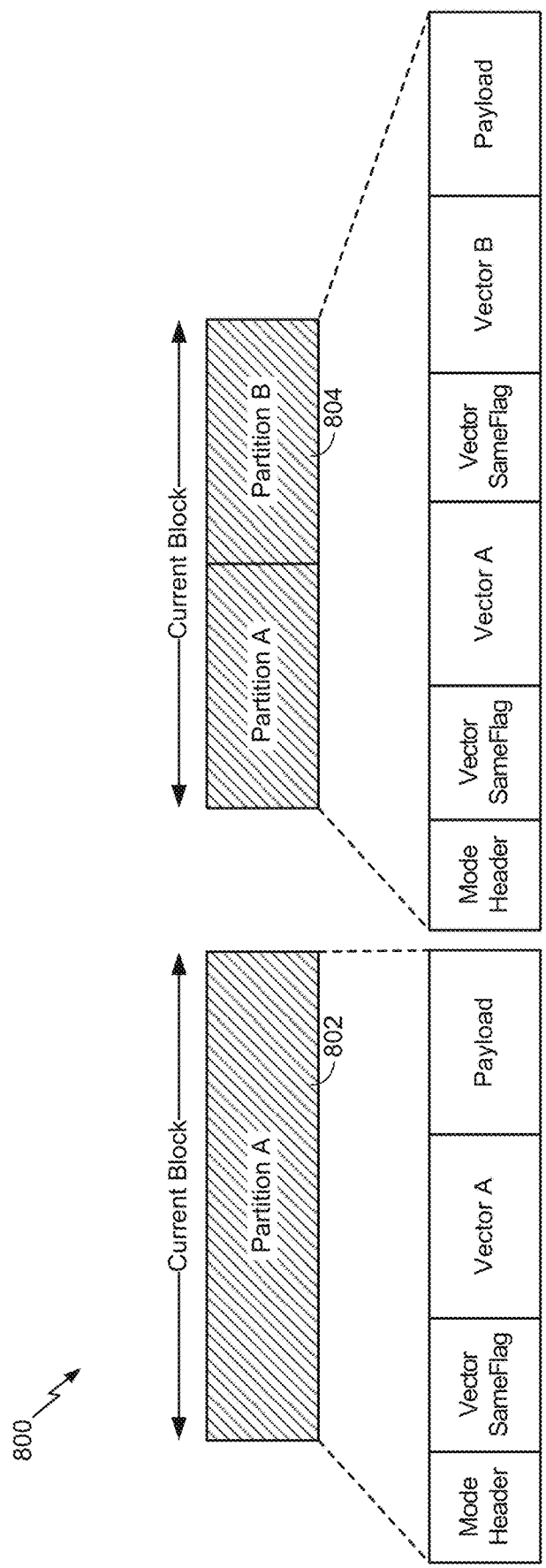
FIG. 8 is a block diagram illustrating a block having partitions in accordance with aspects described in this disclosure.

As shown in FIG. 8, a current block 802 contains a single partition. The information signaled for the current block 802 comprises a mode header, a vector SameFlag, a vector A, and a payload. A current block 804 contains two partitions, partition A and partition B. The information signaled for the current block 804 comprises a mode header, a vector SameFlag, a vector A, a vector SameFlag, a vector B, and a payload. As described above, one or more items listed above may not be signaled. For example, if the vector SameFlag is equal to 1, the following vector need not be signaled.

The partition size β may determine the partitioning of the current block into separate sub-blocks. In such a case, a separate block prediction may be performed for each sub-block. For example, if the block size is N=16 and partition size β=8, then the search will be performed for each of the 16/8=2 partitions. In another example, if β=N, block partitioning is disabled. If β<N, then each vector may be signaled explicitly to the decoder. If vector prediction (e.g., using previously signaled vectors to define the current vectors) is not employed, then each vector will be signaled using a fixed-length or variable-length code. If vector prediction is employed, the first vector may be predicted from the previous coded vector (e.g., stored in memory) and for n>0, vector n is predicted from vector n−1.

Advantages

One or more block prediction mode techniques described in the present disclosure may be implemented using an asymmetrical design. The asymmetric design allows more expensive procedures to be performed on the encoder side, decreasing complexity of the decoder. For example, because the vector(s) are explicitly signaled to the decoder, the encoder does the majority of the work compared with the decoder. This is desirable as the encoder is often part of a System on a Chip (SoC) design, running at a high frequency on a cutting-edge process node (e.g., 20 nm and below). Meanwhile, the decoder is likely to be implemented on a Display Driver Integrated Circuit (DDIC) chip-on-glass (COG) solution with a limited clock speed and a much larger process size (e.g., 65 nm and above).

Additionally, according to one or more embodiments of the present disclosure, block partitioning allows for improved coding efficiency, since blocks with content transitions may be found optimally by two separate vectors.

Further, according to one or more embodiments of the present disclosure, each vector is effectively predicted from the previous vector. Exploiting spatial correlation between the current line and blocks in the previous line yields a bit-savings when signaling the vector(s) to the decoder.

In some implementations of the present disclosure, the block prediction mode techniques described herein may be used in a mathematically lossless codec by removing the quantization step and potentially changing the statistics of the codebook used to encode prediction residuals. Further, the block prediction mode techniques described herein may be used in a codec making use of a single line buffer (i.e. 1-D block size) or multiple line buffers (i.e., 2-D block size). Additionally, search in the current line for the first line in slice condition improves quality for the first line even though no vertical neighbors are available for prediction.

Performance

Figure 9:
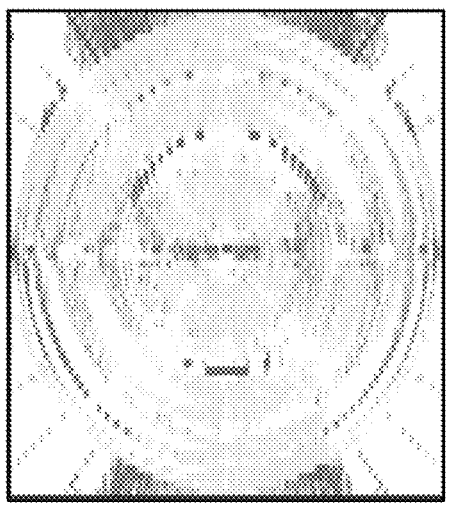
FIG. 9 is an example image content in which block prediction mode is disabled.
Figure 10:
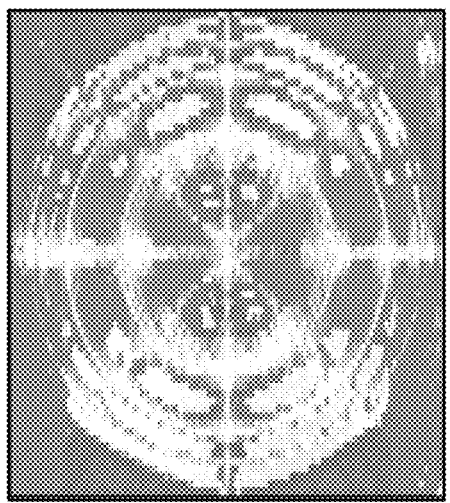
FIG. 10 is an example image content in which block prediction mode is enabled in accordance with aspects described in this disclosure.

The performance of one or more embodiments of the present disclosure can best be demonstrated by examining content that may be difficult to code without using block prediction mode. FIGS. 9 and 10 illustrate example image content that is coded with and without block prediction mode, respectively. All examples shown use a fixed rate 4:1 compression. Objective quality is measured using Peak Signal to Noise Ratio (PSNR), which is a common objective metric for image quality.

The rate control mechanism of the codec described herein may be designed to select the best coding mode for each block based on the trade-off between rate and distortion. Therefore, the fact that block prediction mode is selected for the majority of blocks in the content illustrated in FIG. 10 is an indication that block prediction mode provides superior coding efficiency for this type of content.

The image content 900 shown in FIG. 9, in which block prediction mode was disabled, has a PSNR of 36.30 dB. The image content 900 includes, from left to right, a reconstructed image, a per-block mode selection map, and a zoomed-in region of reconstructed image. The image content 1000 shown in FIG. 10, in which block prediction mode was enabled, has a PSNR of 45.60 dB. The image content 1000 includes, from left to right, a reconstructed image, a per-block mode selection map (where block prediction blocks are shown in magenta), and a zoomed-in region of reconstructed image.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for encoding video data in block prediction mode, the method comprising:
    partitioning a current block of a current slice into a plurality of sub-blocks, wherein samples of the current block are in a YCoCg color format;
    determining a sum of absolute differences (SAD) metric between the current block and each of a plurality of candidate blocks, wherein each respective SAD metric for the plurality of blocks is determined as a SAD value of luma (Y) samples added to an average of a first SAD value of a first chroma (Co) samples and a second SAD value of a second chroma (Cg) sample, and wherein each of the plurality of candidate blocks is a previously reconstructed block in the same picture as the current block;
    determining a respective candidate block of the plurality of candidate blocks for predicting each of the plurality of sub-blocks of the current block of the current slice based on the respective SAD metric between the current block and the respective candidate block, each pixel in the respective candidate blocks being within a search range defined by one or more block prediction parameters, wherein the search range includes at least one or more pixels in a current line that includes the current block, wherein the SAD metric comprises a luma SAD metric for luma samples of the current block added to a chroma SAD metric;
    determining, based on the respective candidate blocks and the plurality of sub-blocks of the current block, a respective prediction vector identifying a location of each of the respective candidate blocks with respect to the plurality of sub-blocks of the current block;
    predicting the respective prediction vectors for the current block from previously-coded prediction vectors to form prediction vector residuals;
    signaling the prediction vector residuals; and
    encoding the current block based at least in part on the respective prediction vectors.

2. The method of claim 1, wherein the one or more block prediction parameters comprise (i) a search range parameter defining a size of the search range, (ii) a skew parameter defining a relative location of the search range with respect to the plurality of sub-blocks of the current block, and (iii) a partition size parameter defining a size of each sub-block in the current block.

3. The method of claim 1, wherein the current line does not have any preceding lines in the current slice.

4. The method of claim 1, wherein the current line has at least one preceding line in the current slice.

5. The method of claim 1, wherein the current block spans more than one line in the current slice.

6. The method of claim 1, wherein the current block spans a single line in the current slice.

7. The method of claim 1, further comprising:
    determining residuals based on the respective candidate blocks and the plurality of sub-blocks of the current block, wherein each of the residuals represents a difference between one of the respective candidate blocks and one of the plurality of sub-blocks of the current block; and
    signaling the residuals along with the prediction vector residuals.

8. The method of claim 7, wherein signaling the residuals comprises signaling the residuals using one of a fixed-length code or a variable-length code.

9. The method of claim 7, wherein signaling the residuals comprises:
    partitioning the residuals into a plurality of groups, wherein the residuals comprise a plurality of residual values that are each associated with one of the plurality of groups;
    determining, for each group, that the group contains at least one residual value that is non-zero; and
    signaling, for each group, the residual values associated with the group using a delta size unit variable length coding, based on a determination that the group contains at least one residual value that is non-zero.

10. The method of claim 7, further comprising:
    transforming the residuals using one of a direct cosine transform or a Hadamard transform.

11. The method of claim 1, wherein at least a portion of the respective candidate blocks is outside the current slice, the method further comprising:
    setting the portion of the respective candidate blocks that is outside the current slice to a default value.

12. An apparatus for encoding video data in block prediction mode, the apparatus comprising:
    a memory configured to store the video data; and
    a processor in communication with the memory and configured to:
        partition a current block of a current slice into a plurality of sub-blocks, wherein samples of the current block are in a YCoCg color format;
        determine a sum of absolute differences (SAD) metric between the current block and each of a plurality of candidate blocks, wherein each respective SAD metric for the plurality of blocks is determined as a SAD value of luma (Y) samples added to an average of a first SAD value of a first chroma (Co) samples and a second SAD value of a second chroma (Cg) sample, and wherein each of the plurality of candidate blocks is a previously reconstructed block in the same picture as the current block;
        determine a respective candidate block of the plurality of candidate blocks for predicting each of the plurality of sub-blocks of the current block of the current slice based on the respective SAD metric between the current block and the respective candidate block, each pixel in the respective candidate blocks being within a search range defined by one or more block prediction parameters, wherein the search range includes at least one or more pixels in a current line that includes the current block;
        determine, based on the respective candidate blocks and the plurality of sub-blocks of the current block, a respective prediction vector identifying a location of each of the respective candidate blocks with respect to the plurality of sub-blocks of the current block;
        predict the respective prediction vectors for the current block from previously-coded prediction vectors to form prediction vector residuals;
        signal the prediction vector residuals; and
        encode the current block based at least in part on the respective prediction vectors.

13. The apparatus of claim 12, wherein the one or more block prediction parameters comprise (i) a search range parameter defining a size of the search range, (ii) a skew parameter defining a relative location of the search range with respect to the plurality of sub-blocks of the current block, and (iii) a partition size parameter defining a size of each sub-block in the current block.

14. The apparatus of claim 12, wherein the current line does not have any preceding lines in the current slice.

15. The apparatus of claim 12, wherein the current line has at least one preceding line in the current slice.

16. The apparatus of claim 12, wherein the current block spans more than one line in the current slice.

17. The apparatus of claim 12, wherein the current block spans a single line in the current slice.

18. The apparatus of claim 12, wherein the processor is further configured to:
  determine residuals based on the respective candidate blocks and the plurality of sub-blocks of the current block, wherein each of the residuals represents a difference between one of the respective candidate blocks and one of the plurality of sub-blocks of the current block; and
  signal the residuals along with the prediction vector residuals.

19. The apparatus of claim 18, wherein the processor is further configured to signal the residuals using one of a fixed-length code or a variable-length code.

20. The apparatus of claim 18, wherein the processor is further configured to:
  partition the residuals into a plurality of groups, wherein the residuals comprise a plurality of residual values that are each associated with one of the plurality of groups;
  determine, for each group, that the group contains at least one residual value that is non-zero; and
  signal, for each group, the residual values associated with the group using a delta size unit variable length coding, based on a determination that the group contains at least one residual value that is non-zero.

21. The apparatus of claim 18, wherein the processor is further configured to transform the residuals using one of a direct cosine transform or a Hadamard transform.

22. The apparatus of claim 12, wherein at least a portion of the respective candidate blocks is outside the current slice, and wherein the processor is further configured to set the portion of the respective candidate blocks that is outside the current slice to a default value.

23. A non-transitory computer readable medium comprising code that, when executed, causes an apparatus to:
  partition a current block of a current slice into a plurality of sub-blocks, wherein samples of the current block are in a YCoCg color format;
  determine a sum of absolute differences (SAD) metric between the current block and each of a plurality of candidate blocks, wherein each respective SAD metric for the plurality of blocks is determined as a SAD value of luma (Y) samples added to an average of a first SAD value of a first chroma (Co) samples and a second SAD value of a second chroma (Cg) sample, and wherein each of the plurality of candidate blocks is a previously reconstructed block in the same picture as the current block;
  determine a respective candidate block of the plurality of candidate blocks for predicting each of the plurality of sub-blocks of the current block of the current slice based on the respective SAD metric between the current block and the respective candidate block, each pixel in the respective candidate blocks being within a search range defined by one or more block prediction parameters, wherein the search range includes at least one or more pixels in a current line that includes the current block;
  determine, based on the respective candidate blocks and the plurality of sub-blocks of the current block, a respective prediction vector identifying a location of each of the respective candidate blocks with respect to the plurality of sub-blocks of the current block;
  predict the respective prediction vectors for the current block from previously-coded prediction vectors to form prediction vector residuals;
  signal the prediction vector residuals; and
  encode the current block based at least in part on the respective prediction vectors.

24. The computer readable medium of claim 23, wherein the one or more block prediction parameters comprise (i) a search range parameter defining a size of the search range, (ii) a skew parameter defining a relative location of the search range with respect to the plurality of sub-blocks of the current block, and (iii) a partition size parameter defining a size of each sub-block in the current block.

25. The computer readable medium of claim 23, wherein the current line does not have any preceding lines in the current slice.

26. A video coding device configured to encode video data in a bitstream in block prediction mode, the video coding device comprising:
  means for partitioning a current block of a current slice into a plurality of sub-blocks, wherein samples of the current block are in a YCoCg color format;
  means for determining a sum of absolute differences (SAD) metric between the current block and each of a plurality of candidate blocks, wherein each respective SAD metric for the plurality of blocks is determined as a SAD value of luma (Y) samples added to an average of a first SAD value of a first chroma (Co) samples and a second SAD value of a second chroma (Cg) sample, and wherein each of the plurality of candidate blocks is a previously reconstructed block in the same picture as the current block;
  means for determining a respective candidate block of the plurality of candidate blocks for predicting each of the plurality of sub-blocks of the current block of the current slice based on the respective SAD metric between the current block and the respective candidate block, each pixel in the respective candidate blocks being within a search range defined by one or more block prediction parameters, wherein the search range includes at least one or more pixels in a current line that includes the current block;
  means for determining, based on the respective candidate blocks and the plurality of sub-blocks of the current block, a respective prediction vector identifying a location of each of the respective candidate blocks with respect to the plurality of sub-blocks of the current block;
  means for predicting the respective prediction vectors for the current block from previously-coded prediction vectors to form prediction vector residuals;
  means for signaling the prediction vector residuals; and
  means for encoding the current block based at least in part on the respective prediction vectors.

27. The video coding device of claim 26, wherein the one or more block prediction parameters comprise (i) a search range parameter defining a size of the search range, (ii) a skew parameter defining a relative location of the search range with respect to the plurality of sub-blocks of the current block, and (iii) a partition size parameter defining a size of each sub-block in the current block.

28. The video coding device of claim 26, wherein the current line does not have any preceding lines in the current slice.

* * * * *